(12) United States Patent
Di et al.

(10) Patent No.: US 8,837,355 B2
(45) Date of Patent: Sep. 16, 2014

(54) BEARER PROCESSING METHOD AND MOBILE MANAGEMENT DEVICE

(75) Inventors: Zhiyu Di, Shenzhen (CN); Wenfu Wu, Shenzhen (CN); Shanshan Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 515 days.

(21) Appl. No.: 12/779,458

(22) Filed: May 13, 2010

(65) Prior Publication Data

US 2010/0220662 A1     Sep. 2, 2010

Related U.S. Application Data

(63) Continuation of application No. PCT/CN2009/070565, filed on Feb. 27, 2009.

(30) Foreign Application Priority Data

Mar. 13, 2008    (CN) .......................... 2008 1 0085728

(51) Int. Cl.
| | |
|---|---|
| H04W 4/00 | (2009.01) |
| H04L 12/26 | (2006.01) |
| H04W 76/06 | (2009.01) |
| H04W 76/04 | (2009.01) |
| H04W 8/20 | (2009.01) |

(52) U.S. Cl.
CPC ............ H04W 76/062 (2013.01); *H04W 76/06* (2013.01); *H04W 76/041* (2013.01); *H04W 8/20* (2013.01); *H04W 76/068* (2013.01)
USPC .......................................... 370/328; 370/252

(58) Field of Classification Search
None
See application file for complete search history.

(56) References Cited

U.S. PATENT DOCUMENTS

| | | | |
|---|---|---|---|
| 2004/0156338 A1 | 8/2004 | Pasanen et al. | |
| 2005/0122945 A1* | 6/2005 | Hurtta | 370/338 |
| 2005/0243820 A1* | 11/2005 | Chen | 370/389 |

(Continued)

FOREIGN PATENT DOCUMENTS

| | | |
|---|---|---|
| CN | 1499761 A | 5/2004 |
| CN | 1870621 A | 11/2006 |

(Continued)

OTHER PUBLICATIONS

Office Action issued in corresponding Russian Patent Application No. 2010105065, mailed Apr. 4, 2011.

(Continued)

*Primary Examiner* — Ayaz Sheikh
*Assistant Examiner* — Sori Aga
(74) *Attorney, Agent, or Firm* — Brinks Gilson & Lione

(57) ABSTRACT

A bearer processing method and a network device are provided. The method includes: determining whether a corresponding user equipment (UE) exists, if user subscription data recorded in a mobile management device is changed; and initiating a bearer modification or deletion process by the mobile management device according to the determining result with regard to whether the UE exists. The mobile management device includes: a storage unit, adapted to record user subscription data; a determination unit, adapted to determine whether a corresponding UE exists, after the user subscription data recorded in the storage unit is changed; and a trigger unit, adapted to initiate a bearer modification or deletion process according to the determining result with respect to whether the UE exists.

12 Claims, 5 Drawing Sheets

(56) References Cited

U.S. PATENT DOCUMENTS

| | | | | |
|---|---|---|---|---|
| 2008/0132269 | A1* | 6/2008 | Shen et al. | 455/550.1 |
| 2009/0111428 | A1* | 4/2009 | Blommaert et al. | 455/411 |
| 2012/0320811 | A1* | 12/2012 | Islam et al. | 370/311 |

FOREIGN PATENT DOCUMENTS

| | | |
|---|---|---|
| CN | 101047991 A | 10/2007 |
| CN | 101052199 A | 10/2007 |
| CN | 101119197 A | 2/2008 |
| CN | 101472271 B | 7/2012 |
| KR | 20020048506 A | 6/2002 |
| WO | 2004/043020 A1 | 5/2004 |
| WO | 2007/140699 A1 | 12/2007 |
| WO | 2008/008100 A2 | 1/2008 |

OTHER PUBLICATIONS

Written Opinion of the International Searching Authority issued in corresponding PCT Patent Application No. PCT/CN2009/070565, mailed Apr. 30, 2009.

Office Action issued in corresponding European Patent Application No. 09718696.9, mailed Jul. 18, 2011.

International Search Report issued in corresponding PCT Application No. PCT/CN2009/070565; mailed Apr. 30, 2009.

Office Action issued in Chinese Patent Application No. 200810085728.3; issued Mar. 29, 2010.

Extended European Search Report issued in corresponding European Patent Application No. 12164350.6, mailed May 25, 2012.

"3$^{rd}$ Generation Partnership Project: Technical Specification Group Services and System Aspects; General Packet Radio Services (GPRS) Enhancements for Evolved Universal Terrestrial Radio Access Network (E-UTRAN) Access (Release 8)" Global System for Mobile Communications. Dec. 2007.

"3$^{rd}$ Generation Partnership Project: Technical Specification Group Services and System Aspects; General Packet Radio Services (GPRS) Enhancements for Evolved Universal Terrestrial Radio Access Network (E-UTRAN) Access (Release 8)" Global System for Mobile Communications. Mar. 2008.

Nokia et al. "SAE Architecture Alternative A" 3GPP TSG SA WG2 Architecture—SAE Adhoc. Oct. 2006:1-11.

Partial English Translation of previously submitted Chinese Office Action issued in corresponding Chinese Patent Application No. 200810085728.3.

Supplementary European Search Report issued in corresponding European Patent Application No. 09 71 8696; issued Jun. 15, 2010.

* cited by examiner

BEARER PROCESSING METHOD AND MOBILE MANAGEMENT DEVICE

CROSS-REFERENCE TO RELATED APPLICATIONS

This application is a continuation of International Application No. PCT/CN2009/070565, filed on Feb. 27, 2009, which claims priority to Chinese Patent Application No. 200810085728.3, filed on Mar. 13, 2008, both of which are hereby incorporated by reference in their entireties.

FIELD OF THE APPLICATION

The present application relates to communication technologies, and more particularly to a bearer processing method and a mobile management device.

BACKGROUND OF THE APPLICATION

The core network of the long term evolution (LTE) wireless network mainly includes three logic function entities, namely, a mobility management entity (MME), a serving gateway (S-GW), and a packet data network (PDN) gateway (P-GW). The MME is responsible for non access stratum (NAS) signaling and NAS signaling encryption, roaming, and tracking functions, and is responsible for distributing a temporary user identity and security function. The MME is corresponding to a control plane part of the serving general packet radio service supporting node (SGSN) in the current universal mobile telecommunications system (UMTS). The S-GW is responsible for the local mobility anchor point, the mobility anchor point in the third generation partnership project (3GPP) system, and lawfully intercepting relevant information. The P-GW is responsible for policy enforcement, charging, and lawfully intercepting relevant functions, in which the policy enforcement and the charging are based on a policy and charge control (PCC) rule. The PCC rule is delivered to the P-GW by a policy and charging rules function (PCRF). When the PCRF delivers the PCC rule, the PCC rule is determined according to the user's current radio access technique (RAT), and different PCC rules may be delivered depending upon different RATs.

In the LTE network, a subscription data insertion process initiated by a home subscriber server (HSS), by taking a subscription data insertion process initiated to the MME as an example, includes: sending, by the HSS, a subscription data insertion message to the MME; and updating, by the MME, the saved subscription data, and returns a subscription data insertion acknowledgement message to the HSS.

After the HSS initiates the subscription data insertion process to the MME or SGSN, if the user subscription data recorded in the MME or SGSN is changed, for example, if the default quality of service (QoS) is changed, the MME or SGSN immediately initiates a bearer modification or deletion process after the subscription data insertion process.

If the HSS modifies a great deal of user subscription data at the same time, the MME or SGSN simultaneously initiates a bearer modification process to a large number of users, among which many users are in the Idle state. Accordingly, the MME or SGSN initiates paging to a large number of users in the Idle state respectively within the same time period. However, at this moment, the users have no services, and thus it wastes the available resources on the MME or SGSN to initiate an independent paging for the purpose of realizing the bearer modification.

SUMMARY OF THE APPLICATION

Embodiments of the present application provide a bearer processing method and a mobile management device, which are applicable to correctly and efficiently complete a bearer process after user subscription data is changed.

An embodiment provides a bearer processing method, which includes:

determining whether a corresponding user equipment (UE) exists, if user subscription data recorded in a mobile management device is changed; and initiating, by the mobile management device, a bearer modification or deletion process according to the determining result with regard to whether the corresponding UE exists.

Another embodiment provides a mobile management device, which includes a storage unit, a determination unit, and a trigger unit. The storage unit is adapted to record user subscription data. The determination unit is adapted to determine whether a corresponding UE exist, if the user subscription data recorded in the storage unit is changed. The trigger unit is adapted to initiate a bearer modification or deletion process according to the determining result with regard to whether the UE exists.

According to the bearer processing method provided in the embodiments, after a subscription data insertion or deletion process, if the user subscription data recorded in the mobile management device is changed, the mobile management device firstly determines whether the corresponding UE exists and then determines whether to initiate a bearer modification or deletion process according to the determining result with regard to whether the UE exists, thereby correctly and efficiently completing a bearer process after the user subscription data is changed.

DETAILED DESCRIPTION OF THE EMBODIMENTS

In order to enable persons skilled in the art to better understand the solutions provided by the embodiments, the embodiments are further described in detail below with reference to the accompanying drawings and implementations.

In order to improve the resource utilization rate of a network device and complete the bearer process correctly and efficiently after the user subscription data is changed, in a bearer processing method according to an embodiment, after a subscription data insertion or deletion process, for example, after the HSS initiates a subscription data insertion process to the MME and/or SGSN, if the user subscription data recorded in a mobile management device is changed, the mobile management device firstly determines whether a corresponding UE exists and then determines whether to initiate a bearer modification or deletion process according to the determining result with regard to whether the corresponding UE exists.

The method in the embodiment is not only applicable to a single radio access technique system, such as a 2G or 3G system or a system architecture evolution (SAE) system, but also applicable to an application environment in which a plurality of radio access technique systems coexist, such as an application environment in which the SAE system and the 2G system coexist or an application environment in which the SAE system and the 3G system coexist.

In the following, the bearer processing method under different application environment conditions are described through specific examples.

Figure 1:
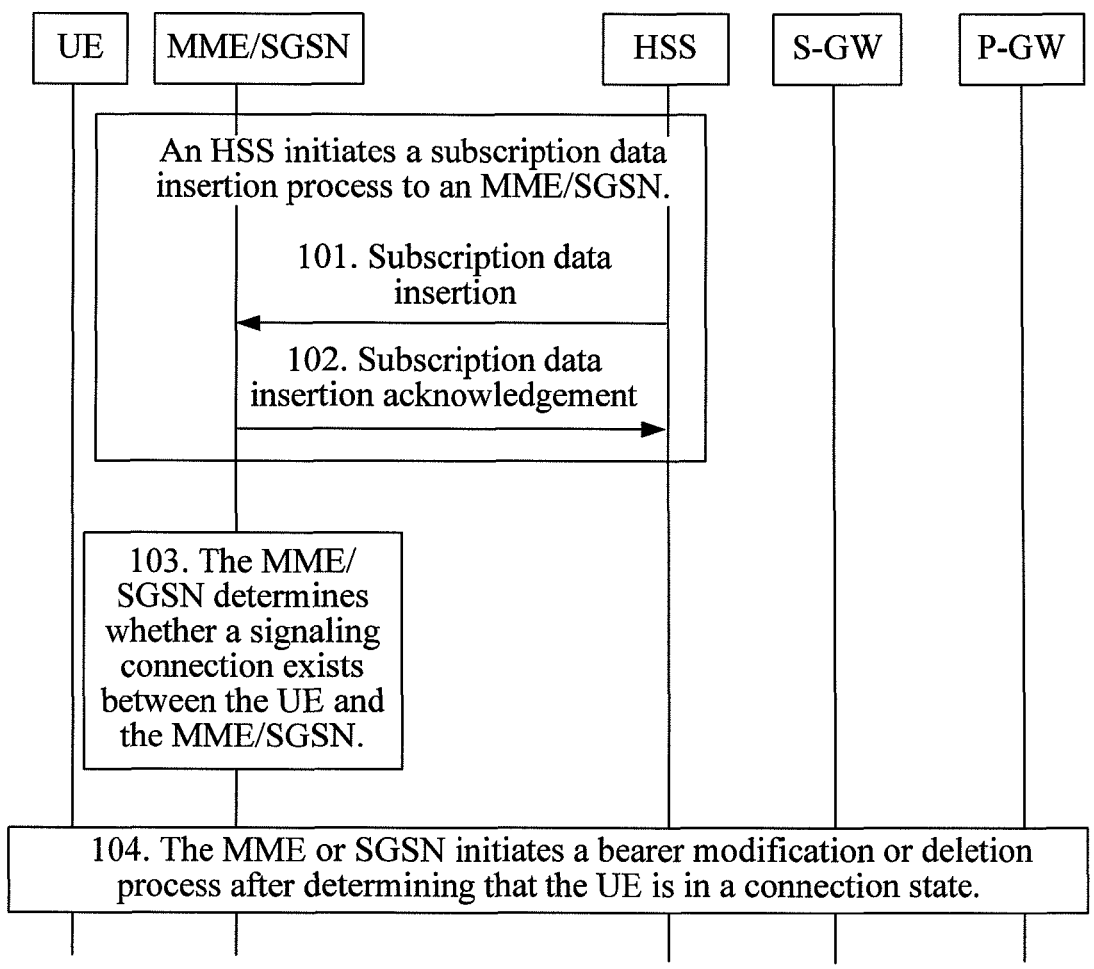
FIG. 1 is a flow chart of a bearer processing method according to a first embodiment.

FIG. 1 is a flow chart of a bearer processing method according to a first embodiment. Referring to FIG. 1, the method includes the following steps.

In step 101, an HSS sends a subscription data insertion message to an MME or SGSN.

In step 102, the MME or SGSN updates the saved subscription data, and returns a subscription data insertion acknowledgement message to the HSS.

In step 103, the MME or SGSN determines whether a signaling connection exists between a UE and the MME or SGSN.

The MME or SGSN determines whether a signaling connection exists between the UE and the MME or SGSN through the following two manners.

1. The MME or SGSN queries whether an index of a signaling connection in the saved user context is valid, and if the index is valid, it is determined that the signaling connection exists between the UE and the MME or SGSN.

2. The MME or SGSN queries whether a user mobile management state in the saved user context is the Idle state or the Connection state, and if the user is in the Connection state, it is determined that the signaling connection exists between the UE and the MME or SGSN.

In step 104, the MME or SGSN initiates a bearer modification or deletion process after determining that the UE is in the Connection state.

In steps 101 and 102, the HSS initiates the subscription data insertion process to a network device. After steps 101 and 102, the subscription data in the MME or SGSN is changed, for example, the default QoS is changed, and after the subscription data insertion process, the MME or SGSN firstly detects whether a signaling connection exists between the UE and the MME or SGSN, instead of immediately initiating a bearer modification or deletion process, and then performs the following different processes.

If a signaling connection exists between the UE and the MME or SGSN, the MME or SGSN initiates a bearer modification or deletion process.

If no signaling connection exists between the UE and the MME or SGSN, the MME or SGSN does not initiate a bearer modification or deletion process. When the UE initiates a service request process, or the network side receives downstream data or signaling and triggers the UE to generate a service request process, the MME or SGSN detects that the UE has been in the Connection state and then initiates a bearer modification or deletion process.

This embodiment is also applicable to a scenario under an idle state signaling reduction (ISR) mechanism. After the HSS initiates a subscription data insertion process to the MME and/or SGSN, the MME and the SGSN perform individual processing on two sides according to the above mechanism.

In the bearer processing method according to this embodiment, after the HSS initiates the subscription data insertion process to the mobile management device, if the subscription data in the MME or SGSN is changed, the MME or SGSN does not initiate a bearer modification or deletion process until the MME or SGSN detects that a signaling connection exists between the UE and the MME or SGSN, instead of immediately initiating a bearer modification or deletion process after the subscription data insertion process. Thus, the MME or SGSN does not initiate independent paging for the purpose of realizing the bearer modification, thereby saving the available resources on the MME or SGSN.

Under the ISR mechanism, the UE is required to be registered to the MME and the SGSN respectively. When a dual-registration HSS initiates a subscription data insertion process to the MME and the SGSN at the same time, according to the current mechanism, the MME and the SGSN may initiate a context modification or deletion process respectively. Regarding the same user bearer on the S-GW, if the MME and the SGSN initiate a modification or deletion request on the bearer to the S-GW at the same time, the S-GW discards the request information that is reached later. If the user is just in an access mode corresponding to the request information that is reached later, a bearer modification or deletion process caused by the request information that is reached earlier is implemented in an access network on the other side. Even if the bearer modification or deletion process caused by the request information that is reached earlier can be successful, if the subscription data based on which the bearer modification or deletion process is performed is inconsistent with the subscription data on the side (the access mode corresponding to the request information that is reached later), the MME or SGSN on the side continuously initiates a bearer modification process, thereby wasting the signaling numbers. However, the bearer processing method according to the first embodiment can avoid wasting the signaling numbers, and the corresponding illustrations are given below with examples.

Figure 2:
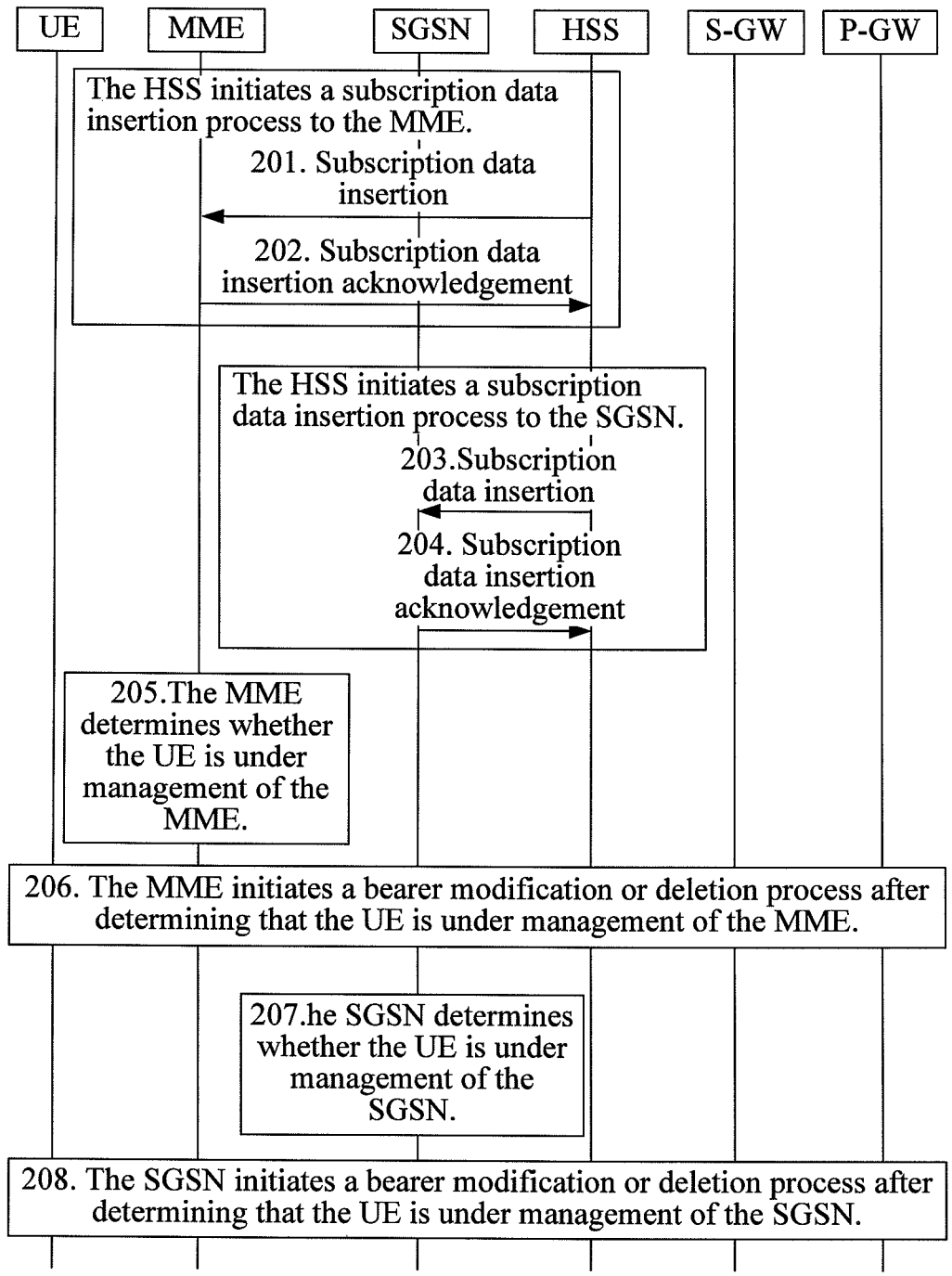
FIG. 2 is a flow chart of a bearer processing method according to a second embodiment.

FIG. 2 is a flow chart of a bearer processing method according to a second embodiment. Under an ISR mechanism, the method mainly includes the following steps.

In step 201, an HSS sends an subscription data insertion message to an MME.

In step 202, the MME updates the saved subscription data, and returns a subscription data insertion acknowledgement message to the HSS.

In step 203, the HSS sends a subscription data insertion message to an SGSN.

In step 204, the SGSN updates the saved subscription data, and returns a subscription data insertion acknowledgement message to the HSS.

In step 205, the MME determines whether the UE is under management of the MME.

In step 206, the MME initiates a bearer modification or deletion process after determining that the UE is under management of the MME.

In step 207, the SGSN determines whether the UE is under management of the SGSN.

In step 208, the SGSN initiates a bearer modification or deletion process after determining that the UE is under management of the SGSN.

In steps 205 and 207, the MME or SGSN may determine whether the UE is under management of the MME or SGSN through the following manners.

The MME or SGSN determines whether a signaling connection exists between the UE and the MME or SGSN, and the specific determining manners have been described above in detail. If the MME or SGSN determines that a signaling connection exists between the UE and the MME or SGSN, the MME or SGSN can determine that the UE is under management of the MME or SGSN. If the MME or SGSN determines that no signaling connection exists between the UE and the MME or SGSN, the MME or SGSN pages the UE and detects whether to cause the UE to trigger a service request. If detecting that the UE has triggered the service request, the MME or SGSN can determine that the UE is under management of the MME or SGSN. If detecting that the UE does not trigger a service request, the MME or SGSN can determine that the UE is not under management of the MME or SGSN.

When the MME or SGSN on one side associated with the UE determines that the UE is under management of the MME or SGSN, a stop paging message or another new message is sent to notify the SGSN or MME on the other side associated with the UE to stop paging the UE.

It should be noted that, steps 201 and 202 and steps 203 and 204 are performed concurrently, which are not subject to a time sequence. Likewise, steps 205 and 206 and steps 207 and 208 are performed concurrently, which are not subject to a time sequence.

In steps 201 and 202 and steps 203 and 204, the HSS initiates the subscription data insertion process to a network device.

After steps 201 and 202, the subscription data in the MME is changed, for example, the default QoS is changed, and after the subscription data insertion process, the MME firstly determines whether the UE exists, instead of immediately initiating a bearer modification or deletion process. Specifically, the MME determines whether the UE is under management of the MME by detecting whether a signaling connection has been established between the MME and the UE or by paging the UE to detect whether to cause the UE to trigger a service request when no signaling connection exists between the MME and the UE, and then performs different processes according to the determined result.

If the UE is under management of the MME, the MME initiates a bearer modification or deletion process.

If the UE is not under management of the MME, the MME does not initiate a bearer modification or deletion process.

Likewise, after steps 203 and 204, the subscription data in the SGSN is changed, for example, the default QoS is changed, and after the subscription data insertion process, the SGSN firstly determines whether the UE exists, instead of immediately initiating a bearer modification or deletion process. Specifically, the SGSN determines whether the UE is under management of the SGSN by detecting whether a signaling connection has been established between the SGSN and the UE or by paging the UE to detect whether to cause the UE to trigger a service request when no signaling connection exists between the SGSN and the UE, and then performs different process according to the determined result.

If the UE is under management of the SGSN, the SGSN initiates a bearer modification or deletion process.

If the UE is not under management of the SGSN, the SGSN does not initiate a bearer modification or deletion process.

In this embodiment, under the ISR mechanism, after the HSS initiates the subscription data insertion process to the MME and/or SGSN, the user subscription data recorded in the MME and/or SGSN is changed, and after the subscription data insertion process, the MME and/or SGSN firstly determines whether the UE exists, instead of immediately initiating a bearer modification or deletion process. The MME and/or SGSN initiate a bearer modification or deletion process after determining that the UE is under management of the MME and/or SGSN. Thus, after the subscription data is changed, the circumstance that the MME and the SGSN initiate a modification or deletion process of the same user bearer on the S-GW to the S-GW at the same time can be avoided, thereby avoiding the waste of the signaling numbers that may occur, and enabling the MME/SGSN to correctly and efficiently complete the bearer process.

This embodiment is also applicable to a scenario under a non-ISR mechanism. The MME or SGSN performs processing according to the above mechanism after the HSS initiates a subscription data insertion process to the MME or SGSN.

Under the ISR mechanism, it is assumed that the MME and the SGSN can address each other, and the user subscription information stored in the HSS is the same set of user subscription information for the SAE and the 2/3G, the HSS fixedly initiates a subscription data insertion process only to the MME or SGSN on a single side.

In the following, by taking the circumstance that the HSS fixedly initiates a subscription data insertion process only to the MME on a single side as an example, the processing mechanisms of the MME and the SGSN are illustrated. When the HSS fixedly initiates a subscription data insertion process only to the SGSN on a single side, the SGSN and the MME may perform similar processes.

Figure 3:
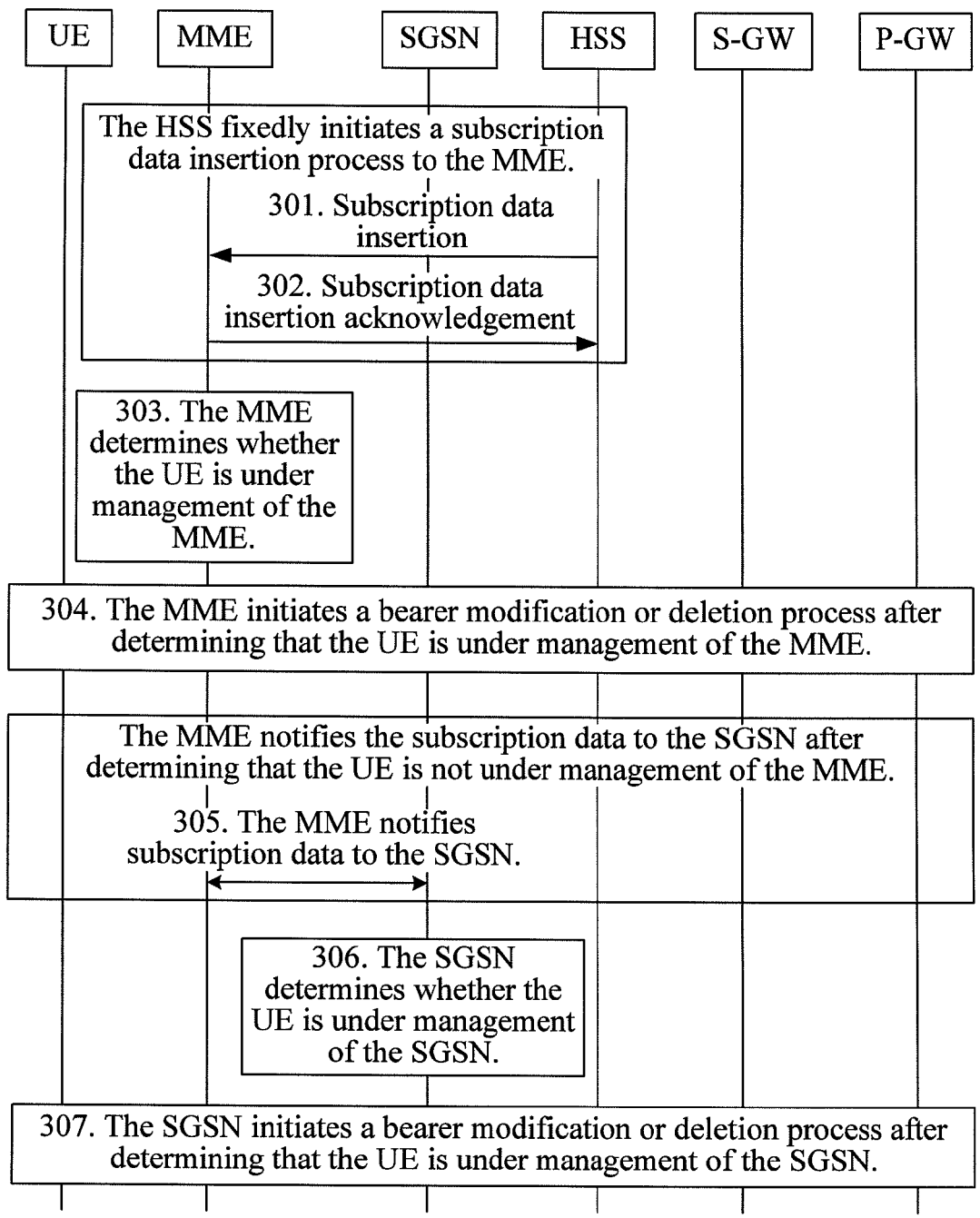
FIG. 3 is a flow chart of a bearer processing method according to a third embodiment.

FIG. 3 is a flow chart of a bearer processing method according to a third embodiment. Referring to FIG. 3, the method includes the following steps.

In step 301, an HSS sends a subscription data insertion message to an MME.

In step 302, the MME updates the saved subscription data, and returns a subscription data insertion acknowledgement message to the HSS.

In step 303, the MME determines whether the UE is under management of the MME, and if the MME determines that the UE is under management of the MME, the process proceeds to step 304; and if the MME determines that the UE is not under management of the MME, the process proceeds to steps 305, 306, and 307.

In step 304, the MME initiates a bearer modification or deletion process after determining that the UE is under management of the MME.

In step 305, the MME notifies the subscription data to the SGSN after determining that the UE is not under management of the MME.

In step 306, the SGSN determines whether the UE is under management of the SGSN.

In step 307, the SGSN initiates a bearer modification or deletion process after determining that the UE is under management of the SGSN.

In this embodiment, under the ISR mechanism, the HSS fixedly initiates the subscription data insertion process only to the MME on a single side. In steps 301 and 302, the HSS initiates the subscription data insertion process to a network device, which is the same as that in the prior art. After steps 301 and 302, the user subscription data recorded in the MME is changed, for example, the default QoS is changed, and after the subscription data insertion process, the MME firstly determines whether the UE exists, instead of immediately initiating a bearer modification or deletion process, so as to specifically determine whether the UE is under management of the MME by detecting whether a signaling connection has been established between the MME and the UE or by paging the UE to detect whether to cause the UE to trigger a service request when no signaling connection exists between the MME and the UE, and then performs the following different processes.

If the UE is under management of the MME, the MME initiates a bearer modification or deletion process.

If the UE is not under management of the MME, the MME does not initiate a bearer modification or deletion process, and sends a message to notify the subscription information to the SGSN.

The SGSN firstly determines whether the UE exists, instead of immediately initiating a bearer modification or deletion process, so as to determine whether the UE is under management of the SGSN by detecting whether a signaling connection has been established between the SGSN and the UE or by paging the UE to detect whether to cause the UE to trigger a service request when no signaling connection exists between the SGSN and the UE, and then performs different processes. If the UE is under management of the SGSN, the SGSN initiates a bearer modification or deletion process. If the UE is not under management of the SGSN, the SGSN does not initiate a bearer modification or deletion process.

In view of the above, the bearer processing method, according to the embodiments, is helpful for enabling the MME/SGSN to correctly and efficiently complete the bearer process under an ISR mechanism after the subscription data is changed.

Under the ISR mechanism, when the user subscription information stored in the HSS are two different sets of user subscription information for the SAE and the ⅔G, or when the same set of information exists, but the HSS initiates an subscription data insertion process to the MME and the SGSN on two sides, the processing processes of the MME and the SGSN after the HSS initiates the subscription data insertion process may be the same as that in the two embodiments of FIGS. 1 and 2, which will not be described herein again.

Figure 4:
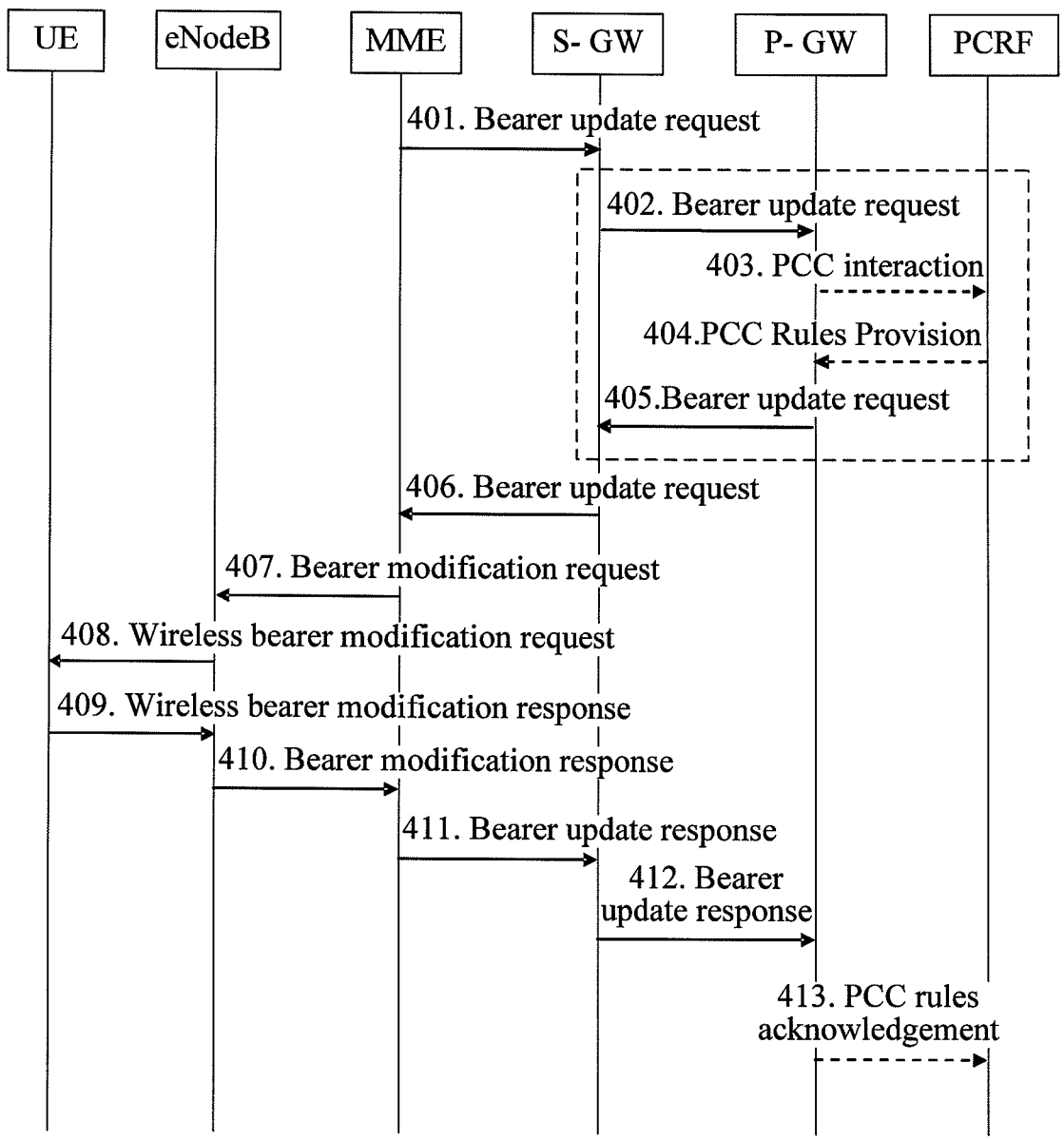
FIG. 4 is a flow chart of a bearer modification initiated by a mobile management device by applying the bearer processing method according to an embodiment.

In each of the embodiments, the bearer modification process initiated by the MME or SGSN is illustrated below as shown in FIG. 4.

In step 401, an MME sends a bearer update request message to an S-GW.

In step 402, the S-GW sends the bearer update request message to a P-GW.

In step 403, if the PCC architecture is used, the P-GW sends a Request PCC Rules message to a PCRF, and notifies the bearer update motion to the PCRF.

In step 404, if a dynamic PCC is configured, the PCRF notifies a QoS rule to the P-GW by sending a PCC Rules Provision message.

In step 405, the P-GW sends the bearer update request message to the S-GW.

In step 406, the S-GW sends the bearer update request message to the MME.

In step 407, the MME sends a bearer modification request message to an eNodeB.

In step 408, the eNodeB initiates a wireless bearer modification process to the UE.

In step 409, the UE returns a wireless bearer modification response message to the eNodeB to confirm the wireless bearer modification.

In step 410, the eNodeB returns the bearer modification response to the MME to confirm the bearer modification.

In step 411, the MME returns a bearer update response message to the S-GW to confirm the bearer modification.

In step 412, the S-GW returns the bearer update response message to the P-GW to confirm the bearer modification.

In step 413, if this process is triggered by the PCC Rules Provision message from the PCRF, the P-GW returns a PCC rules acknowledgement message to the PCRF to indicate whether the requested QoS rule can be implemented.

Figure 5:
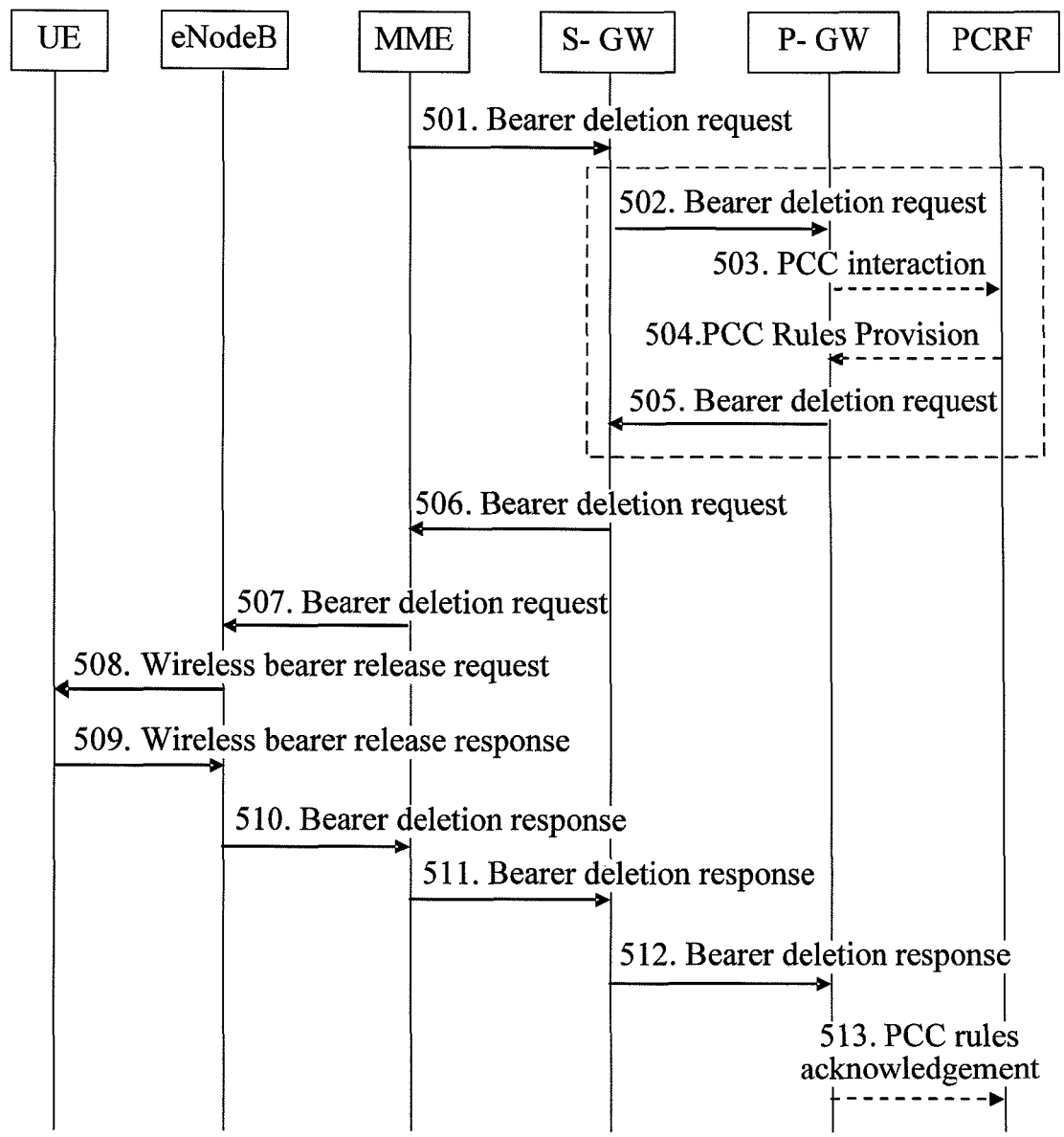
FIG. 5 is a flow chart of a bearer deletion initiated by a mobile management device by applying the bearer processing method according to an embodiment.

In each of the embodiments, the bearer deletion process initiated by the MME or SGSN is illustrated below as shown in FIG. 5.

In step 501, the MME sends a bearer deletion request message to the S-GW.

In step 502, the S-GW sends the bearer deletion request message to the P-GW.

In step 503, if the PCC architecture is used, the P-GW sends a Request PCC Rules message to the PCRF, and notifies the bearer deletion motion to the PCRF.

In step 504, if a dynamic PCC is configured, the PCRF notifies a QoS rule to the P-GW by sending a PCC Rules Provision message.

In step 505, the P-GW sends the bearer deletion request message to the S-GW.

In step 506, the S-GW sends the bearer deletion request message to the MME.

In step 507, the MME sends the bearer deletion request message to the eNodeB.

In step 508, the eNodeB initiates a wireless bearer release process to the UE.

In step 509, the UE returns a wireless bearer release response message to the eNodeB to confirms the wireless bearer release.

In step 510, the eNodeB returns a bearer deletion response to the MME to confirm the bearer deletion.

In step 511, the MME returns the bearer deletion response message to the S-GW to confirm the bearer deletion.

In step 512, the S-GW returns the bearer deletion response message to the P-GW to confirm the bearer deletion.

In step 513, if this process is triggered by the PCC Rules Provision message from the PCRF, the P-GW returns a PCC rules acknowledgement message to the PCRF to indicate whether the requested QoS rule can be implemented.

Persons of ordinary skill in the art should understand that, all of or a part of processes in the method according to the embodiments may be implemented by relevant hardware under the instruction of programs. The programs may be stored in a computer readable storage medium. The storage medium may be a read-only memory (ROM)/random access memory (RAM), a magnetic disk, and an optical disk.

Figure 6:
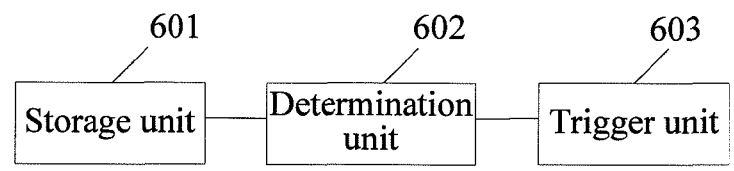
FIG. 6 is a structural block diagram of a mobile management device according to an embodiment.

An embodiment further provides a mobile management device. FIG. 6 is a structural block diagram of a mobile management device according to the embodiment. Referring to FIG. 6, the device mainly includes a storage unit 601, a determination unit 602, and a trigger unit 603. The storage unit 601 is adapted to record user subscription data. The determination unit 602 is adapted to determine whether a corresponding UE exists, after the user subscription data recorded in the storage unit 601 is changed. The trigger unit 603 is adapted to initiate a bearer modification or deletion process according to the determining result with respect to whether the UE exists.

The determination unit 602 includes a first determination subunit and/or a second determination subunit, in which the first determination subunit is adapted to determine whether a signaling connection exists between the UE and the mobile management device, and the second determination subunit is adapted to determine whether the UE is under management of the mobile management device.

The mobile management device according to the embodiment is not only applicable to a single radio access technique system, such as a 2G or 3G system or an SAE system, but also applicable to an application environment in which a plurality of radio access technique systems coexist, such as an application environment in which the SAE system and the 2G system coexist or an application environment in which the SAE system and the 3G system coexist.

The mobile management device may be an MME or an SGSN. Depending upon different application environments, after the subscription data insertion or deletion process is completed, and the recorded user subscription data is changed, the specific processing process of a bearer modification or deletion is consistent with the descriptions of the bearer processing method according to the described embodiments.

As for the mobile management device according to the embodiment, after the user subscription data recorded in the mobile management device is changed, the mobile management device firstly determines whether the UE exists, instead of immediately initiating a bearer modification or deletion process, and further determines whether to initiate a bearer modification or deletion process according to the determining result with respect to whether the UE exists. Thus, the network device does not initiate an independent paging for the purpose of realizing the bearer modification, thereby saving the available resources and facilitating the MME/SGSN to correctly and efficiently complete the bearer process under the ISR mechanism after the subscription data is changed.

The embodiments are described in detail above and are illustrated herein through specific implementations. It is understood that persons of ordinary skill may make variations to the described embodiments with departing from the scope of the claims. Moreover, it is understood that the scope of the claims is not limited to any particular embodiment, described above.

What is claimed is:

1. A bearer processing method, comprising:
    if user subscription data is changed, which user subscription data is initiated by a Home Subscriber Server (HSS):
    determining by a mobile management device whether a signaling connection exists between a corresponding user equipment (UE) and the mobile management device, wherein the determining of whether the signaling connection exists between the corresponding UE and the mobile management device comprises determining whether the corresponding UE is under management of the mobile management device; and
    if the signaling connection exists between the corresponding UE and the mobile management device:
    initiating by the mobile management device, a bearer modification or deletion process; and
    wherein the determining of whether the corresponding UE is under the management of the mobile management device comprises:
    determining whether the mobile management device detects that a signaling connection has already been established between the mobile management device and the corresponding UE; and
    paging, by the mobile management device, the corresponding UE to cause the corresponding UE to trigger a service request when no signaling connection exists.

2. The method according to claim 1, wherein the determining of whether the signaling connection exists between the corresponding UE and the mobile management device, comprising:
    querying, by the mobile management device, that an index of a signaling connection in saved user context is valid.

3. The method according to claim 1, wherein the determining of whether the signaling connection exists between the corresponding UE and the mobile management device, comprises:
    the mobile management device queries and finds that a user mobile management state in saved user context is a Connection state.

4. The method according to claim 1, wherein the initiating of the bearer modification or deletion process comprises:
    determining whether the corresponding UE is under the management of the mobile management device.

5. The method according to claim 1, further comprising:
    after the mobile management device determines that the corresponding UE is under the management of the mobile management device, instructing mobile management devices associated with the corresponding UE in other radio access technique systems to stop paging the corresponding UE by sending a stop paging message.

6. The method according to claim 1, wherein the initiating of the bearer modification or deletion process comprising one or more of:
    if the corresponding UE is under the management of a mobile management device located at where a Home Subscriber Server (HSS) initiates a subscription data insertion process, initiating by the mobile management device, the bearer modification or deletion process to the HSS;
    if the corresponding UE is not under the management of the mobile management device located at where the HSS initiates the subscription data insertion process, sending by the mobile management device, a message to notify subscription information to a mobile management device associated with the corresponding UE to the HSS; and
    initiating by the mobile management device associated with the corresponding UE, the bearer modification or deletion process according to the determined result with respect to whether the corresponding UE exists.

7. The method according to claim 1, wherein the mobile management device comprises a mobility management entity (MME) or a serving general packet radio service supporting node (SGSN).

8. A mobile management device, comprising:
    a storage unit, adapted to record user subscription data sent by a Home Subscriber Server (HSS);
    a determination unit, comprises at least a first determination subunit adapted to determine whether a signaling connection exists between the mobile management device and a corresponding user equipment (UE), wherein the determination takes place after the user subscription data recorded in the storage unit is changed, wherein the user subscription data is initiated by the HSS, wherein the first determination subunit is adapted to determine whether the corresponding UE is under management of the mobile management device by being adapted to determine whether the mobile management device detects that a signaling connection has already been established between the mobile management device and the corresponding UE; and page the corresponding UE to cause the corresponding UE to trigger a service request when no signaling connection exists; and
    a trigger unit, adapted to initiate a bearer modification or deletion process to the corresponding UE according to the determination, if it has been determined that the signaling connection exists between the corresponding UE and the mobile management device.

9. The mobile management device according to claim 8, wherein the mobile management device comprises a mobility management entity (MME) or a serving general packet radio service supporting node (SGSN).

10. The mobile management device according to claim 8, wherein the mobile management device comprises a mobility management entity (MME) or a serving general packet radio service supporting node (SGSN).

11. The method according to claim 1, further comprising:
   if no signaling connection exists between the corresponding UE and the mobile management device, not initiating the bearer modification or deletion process, when the mobile management device detects that the UE has been in the Connection state, and
   otherwise, initiating a bearer modification or deletion process.

12. The mobile management device according to claim 8, wherein the trigger unit is further adapted to:
   not initiate the bearer modification or deletion process if no signaling connection exists between the corresponding UE and the mobile management device, and
   otherwise, initiate a bearer modification or deletion process when the mobile management device detects that the UE has been in the Connection state.

* * * * *